(12) United States Patent
Poledna

(10) Patent No.: US 9,407,696 B2
(45) Date of Patent: Aug. 2, 2016

(54) METHOD FOR COMBINING RESULTS OF PERIODICALLY OPERATING EDP COMPONENTS AT THE CORRECT TIME

(71) Applicant: FTS Computertechnik GmbH, Vienna (AT)

(72) Inventor: Stefan Poledna, Klosterneuburg (AT)

(73) Assignee: FTS Computertechnik GmbH, Vienna (AT)

( * ) Notice: Subject to any disclaimer, the term of this patent is extended or adjusted under 35 U.S.C. 154(b) by 247 days.

(21) Appl. No.: 14/369,080

(22) PCT Filed: Dec. 27, 2012

(86) PCT No.: PCT/AT2012/050208
§ 371 (c)(1),
(2) Date: Jun. 26, 2014

(87) PCT Pub. No.: WO2013/096986
PCT Pub. Date: Jul. 4, 2013

(65) Prior Publication Data
US 2015/0046603 A1    Feb. 12, 2015

(30) Foreign Application Priority Data
Dec. 27, 2011 (AT) .................. A 1887/2011

(51) Int. Cl.
*G06F 15/16* (2006.01)
*H04L 29/08* (2006.01)
*G06F 9/54* (2006.01)
(Continued)

(52) U.S. Cl.
CPC .............. *H04L 67/1095* (2013.01); *G06F 9/52* (2013.01); *G06F 9/542* (2013.01); *G06F 11/1402* (2013.01)

(58) Field of Classification Search
CPC ....... H04L 67/1095; G06F 9/542; G06F 9/52; G06F 11/1402
USPC ................................... 709/202, 242
See application file for complete search history.

(56) References Cited

U.S. PATENT DOCUMENTS

| 7,979,247 B2 | 7/2011 | Butterfield et al. |
| 2003/0140172 A1* | 7/2003 | Woods ................. G04G 15/006 709/248 |

(Continued)

OTHER PUBLICATIONS

Ademaj et al., Tolerating Arbitrary Failures in a Master-Slave Clock-Rate Correction Mechanism for Time-Triggered Fault-Tolerant Distributed Systems with Atomic Broadcast, 2007.*

(Continued)

*Primary Examiner* — Hieu Hoang
(74) *Attorney, Agent, or Firm* — KPPB LLP

(57) ABSTRACT

A system and method for combining results of a multiplicity of periodically operating components of a distributed computer system at the correct time, wherein the components communicate solely by means of messages via at least one communication system, and wherein each component has a global time with the precision P. Each component is unambiguously associated with one of n hierarchical levels wherein the durations of the periods of the components are an integer multiple of one another, and wherein the phase of transmitting each message is synchronized with the corresponding phase of receiving each transmitted message within each longest period of the entire distributed computer system even if the transmitting components and the receiving components are arranged on different hierarchical levels and are spatially distributed.

34 Claims, 1 Drawing Sheet

Figure 1:
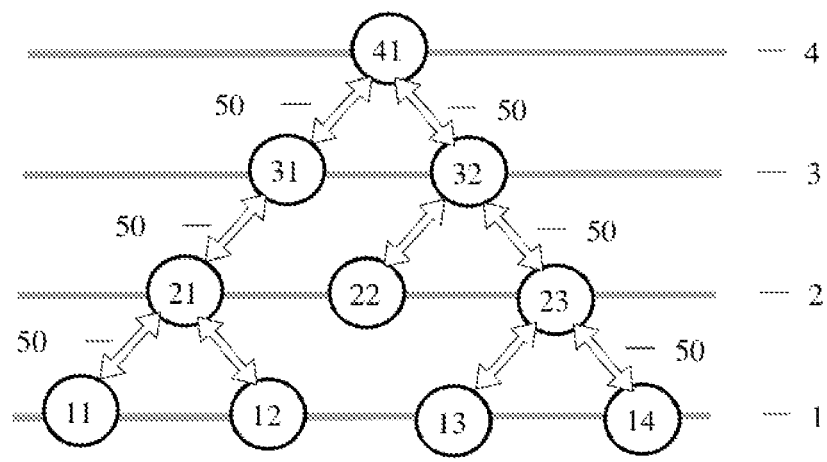

(51) Int. Cl.
*G06F 9/52* (2006.01)
*G06F 11/14* (2006.01)

(56) References Cited

U.S. PATENT DOCUMENTS

| | | | | |
|---|---|---|---|---|
| 2006/0094436 | A1* | 5/2006 | Kim | H04W 72/085 455/450 |
| 2010/0177708 | A1* | 7/2010 | Pandey | H04W 74/0883 370/329 |
| 2010/0180123 | A1* | 7/2010 | Kopetz | G06F 21/64 713/176 |

OTHER PUBLICATIONS

Ademaj et al., Time-Triggered Ethernet and IEEE 1588 Clock Synchronization, 2007.*
SAE Standard von TT Ethernet, Retrieved from: http://standards.sae.org/as6802, Proposed Draft Sep. 9, 2011, 108 pages.
Kopetz "Real-Time Systems, Design Principles for Distributed Embedded Applications", Springer Verlag, 2011, 396 pages.
Simon, The Sciences of the Artificial, MIT Press, 1962., Chapter 8: The Architecture of Complexity: Hierarchic Systems, pp. 183-216.

* cited by examiner

METHOD FOR COMBINING RESULTS OF PERIODICALLY OPERATING EDP COMPONENTS AT THE CORRECT TIME

The present invention is in the field of computer engineering.

The invention specifically relates to a method for combining results of a multiplicity of periodically operating components of a distributed computer system in a chronological correct manner, wherein the components communicate solely by means of messages via at least one communication system, and wherein each component has a global time with the precision P.

The invention also relates to a distributed computer system, in particular for combining results of a multiplicity of periodically operating components of a distributed computer system in a chronological correct manner, wherein the components communicate solely by means of messages via at least one communication system, and wherein each component has a global time with the precision P.

The invention also relates to a distributed computer architecture for combining the results of periodically operating components, in particular EDP components, at the correct time.

The invention describes an innovative method for embedding a plurality of periodically operating components of a distributed real-time system in a hierarchical structure and combining the results of these components at the correct time by means of a time-controlled communication system.

In distributed real-time systems, e.g. in an aircraft, a plurality of components—more than one hundred components in the example of the aircraft—must work together in order to solve the stated problems. The complexity of such a system can be reduced by embedding the components in a hierarchical structure, implementing time-controlled communication between the components according to specified rules, and implementing predictable time behavior of the components and the communication.

The complexity must also be reduced in order to ensure that the system behavior can be predicted after a fault occurs in one of the components. In a safety-critical real-time system—as in the example of the aircraft—essential system functions must be maintained even after components fail.

The particular role that hierarchical models play in the understanding of complex processes has already been extensively addressed by Simon [5] in 1962. Document [1] also proposes that a large system-of-systems have a hierarchical structure.

A problem addressed by the present invention is that of creating a connection of a hierarchical system structure with synchronous behavior of the components and systematic fault containment at the various levels of the hierarchy.

This problem is solved by an aforementioned method and an aforementioned computer system by unambiguously associating each component with one of n hierarchical levels, preferably in system design, wherein the durations of the periods of the components, which are derived from the progression of the global time, are an integer multiple of one another, and wherein the phase of transmitting each message is synchronized with the corresponding phase of receiving each transmitted message within each longest period of the entire distributed computer system even if the transmitting components and the receiving components are arranged on different hierarchical levels and are spatially distributed.

According to the present invention, a hierarchy of periodically operating components is formed, wherein the duration of the period of a component is an integer multiple of a shortest period and wherein one component is unambiguously assigned to a hierarchical level on the basis of the duration of the period thereof. The components having the shortest period form the lowermost hierarchical level and the components having the longest period form the uppermost hierarchical level.

The present invention therefore discloses how a safety-critical, distributed real-time system can be designed such that complexity is reduced. By reducing complexity it is possible to shorten the time required for software development and testing, and to significantly reduce the costs for system development.

The present invention discloses how a safety-critical, distributed real-time system can be designed in order to reduce the cognitive effort required to understand the system functions. The complexity of such a system can be reduced by embedding the components in a hierarchical structure, implementing time-controlled communication between the components according to specified rules, and implementing predictable time behavior of the components and the communication. By reducing complexity it is possible to shorten the time required for software development and testing, and to significantly reduce the costs for system development.

Further advantageous embodiments of the method according to the invention and the computer system according to the invention are described in the dependent claims.

It is advantageous, for example, to synchronize the time at which the message is transported by a time-controlled communication system with the end of the period of the message-transmitting component.

It is favorable for a component of one hierarchical level to communicate only with a component of a higher hierarchical level.

It is also advantageous for a component of a higher hierarchical level to receive messages from a plurality of components of the lower hierarchical levels.

Particularly advantageously, the behavior of a quantity of hierarchically arranged components, which forward information to the next-higher hierarchical level and wherein the information flow forms an In tree, is replaced by or can be replaced by a simulation system, which replaces the upwardly directed behavior of the root of the In tree.

Advantageously, the global time is synchronized with the temps atomique international (TAI) with an accuracy A.

Advantageously, the global time is sparse.

It can also be provided that a marked period of the series of possible periods has the duration of exactly one TAI second.

Advantageously, the messages received and transmitted by a component are distributed via a TTEthernet communication system.

It is also advantageous for the communication system to have a redundant configuration.

It is also favorable for the at least one component, preferably each component, to be a fault-containment unit.

It can also be provided that one component produces either correct messages, no messages, or recognizably false messages.

The global time is preferably fault-tolerant.

Advantageously, the dynamic changing of parameters of the components or the communication system is protected by cryptographic protocols.

Finally, it can also be advantageously provided that one component is a restart unit, which attempts a restart immediately after a fault is detected.

It can also be provided that a component that receives a message checks to determine whether the content of the message corresponds to the dynamic input constraint provided for this message.

It is also advantageous to observe the behavior of the individual components at the correct time without influencing the time behavior of the components.

In real-time data processing, a result is correct only when it conforms to the specification in the value range and in the time range. It therefore makes sense to understand the term "a component" to mean a unit of software and hardware, since only such a unit has defined behavior in the value range and in the time range. This component term comprises a physical component, wherein the component is a physical hardware unit, and a virtual component, wherein a software module is executed in a partition of a larger hardware unit that is provided by a hypervisor.

Advantageously, each component is a fault-containment unit (FCU), in order to ensure that the immediate consequences of an error cause of the specified fault class (e.g. hardware or software) can be limited to a single component. If such components communicate exclusively by means of messages, a secondary fault of a faulty component can propagate beyond the limits of the component only via a faulty message. A message can be faulty in the time range or in the value range. If a time-controlled communication system, such as TTEthernet [6], for example, is used, the time-controlled communication system, which is an independent FCU, can detect the error in the time range and prevent propagation of the fault. In the general case, faults in the value range must be detected by the component that receives the message. To this end, the message recipient must check to determine whether incoming messages correspond to an input assertion. Advantageously, this input assertion is dynamically changeable in order to ensure that the input check can be adapted to the time varying current system state. If a component has fail-silent behavior, i.e. the component produces either correct messages, no messages, or recognizably false messages, all component faults in the time range can be detected by the time-controlled communication system. In the general case, a fail-silent component will comprise two FCUs. In conformance with the fault hypothesis, one of these two FCUs can be very simple, e.g. a dependent watchdog that continuously monitors the function of the component and initiates a restart immediately after a fault is detected. Based on experience, the error cause is transient in the majority of cases, and therefore this restart will be successful in the majority of cases.

Since the technical processes that are controlled by a real-time system take place according to the laws of physics, the physical time plays a special role in real-time data processing. According to the invention, a fault-tolerant global time is therefore introduced, which can be accessed by all components of the system. The design of a fault-tolerant time having a known precision P and an accuracy A is described exactly in ([4], chapter 3). If all significant events that occur in the real-time system are sparse events (see [4], chapter 3], a consistent time order of these events can be established in the entire system.

Figure 2:
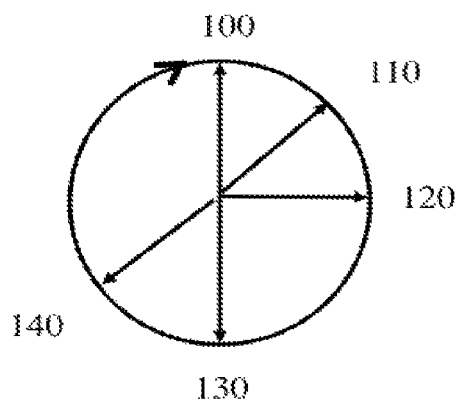

The invention is explained in greater detail in the following by reference to the drawing. Therein:

FIG. 1 shows a number of components, which are assigned to four abstraction levels, and FIG. 2 shows the sequence of a processing cycle in the periodic representation of time.

The description of an implementation that follows is only one of several possibilities for the technical implementation of the invention.

FIG. 1 shows a system having ten components 11-14, 21-23, 31, 32, 41, which exchange messages via a time-controlled communication system 50. The time-controlled communication system 50 is notified a priori, i.e. before use, when a component transmits a message and what is the permissible maximum length of the message. This specification of the communication parameters can take place dynamically and is preferably protected by cryptographic protocols, as is the case for all parameters that can be dynamically changed. The time-controlled communication system 50 is therefore capable of detecting a time malfunction of a component. If the components are fail-silent, the time-controlled communication system can detect all component faults.

In this invention, a hierarchy of periodically operating components 11-14, 21-23, 31, 32, 41 is formed in system design, wherein the duration of the period assigned to a component is an integer multiple of a shortest period. The periods are determined by the progression of the global time. We refer to the shortest period as the basic period. The period of the entire distributed computer system results from the least common multiple (L.C.M.) of the periods of all components. Advantageously, the durations of the periods are a power of two of the shortest period. In this case, the least common multiple of the entire system corresponds to the longest period of a component. The time behavior of the entire distributed computer system repeats according to the product L.C.M.*basic period.

The processing durations of the components can differ in the current architecture. It must be ensured, however, that the processing duration of a component is shorter than the duration of a period that was assigned to this component, i.e. the difference between the period duration and the processing duration, the laxity, must be positive.

This assignment of components to the hierarchical levels 1, 2, 3 4, is made on the basis of the logic of the given application. An example of such an assignment is represented in FIG. 1. According to the logic of the application shown, the ten components 11-14, 21-23, 31, 32, 41 are assigned to four hierarchical levels 1, 2, 3, 4. If the L.C.M. of the periods of these components has the value 30, for example, the time behavior of the entire distributed computer system will therefore repeat after 30 basic periods.

According to the invention, it is favorable for a component of a lower hierarchical level to communicate only with a component of a higher hierarchical level. In FIG. 1, for example, the component 11 communicates with the component 21, and the component 12 communicates with the component 21, but the component 11 does not communicate with the component 12. Such direct communication between the components 11 and 12 should take place only in exceptional cases, if absolutely required by the application. The component 21 has three communication interfaces, namely two directed downwardly to the components 11, 12 and one directed upwardly to the component 31.

If the components 11, 12 comprise sensors, for example, by means of which these components can observe the environment thereof, the information flow between the components 11, 12, 21 can be described by an In tree, wherein the component 21 is the root of the In tree [3]. In this In tree, the information in FIG. 1 flows from the bottom to the top. According to the invention, this In tree can be replaced by a simulation system, which simulates the environment observed by the nodes 11, 12, 21 at the communication interface between the components 21 to 31. In this architecture it is therefore possible to replace parts of the real system by a simulation system for testing purposes. The amount of testing required for the start-up of large distributed systems can therefore be substantially reduced.

For example, a camera can be connected to the component 11 described by reference to FIG. 1, and a radar device for observing the environment can be connected to the component 12. The component 21 implements a data fusion of the results of these two observations in order to identify the objects in the environment. The component 31 decides which reactions to take on the basis of the objects that are observed. In the test phase, the component 21 can be replaced by a simulation system in order to test the correct reactions of the entire system in the most diverse situations.

In order to observe the behavior of a component or a complete In tree without influencing the time behavior of the application, the communication system 50 can copy selected messages and transmit these to an independent observation component. A related method for observing the communication between components at the correct time is disclosed in [2].

FIG. 2 shows the time sequence of the processing in one component and the communication between components. According to the invention, it is assumed that all components operate periodically. Time is subdivided into periods, wherein the circle shown in FIG. 2 is cycled through in the clockwise direction within each period. An event within a period is specified by the phase position, i.e. the phase of the event relative to the period origin. In FIG. 2, for example, the event 100, the period origin in FIG. 2, has the phase 0 degrees, and the event 120 has the phase 90 degrees. The period origin (the event 100) can be synchronized with the global time.

The communication between the components 11, 21, 31 shown in FIG. 1 is described in FIG. 2, wherein the period of component 31 is represented in FIG. 2. If the periodic event 100 occurs, the component 11 begins processing, e.g. reading the sensors of the component 11. At time 110, the processing in the component 11 is concluded and the time-controlled communication system 50 is ready to transport the result of the component 11, in the form of a message, to the component 21. After the message arrives at component 21, at time 120, the component 21 begins processing. The processing is concluded at time 130. At this time 130, the time-controlled communication system 50 is ready to transport the result of the component 21, in the form of a message, to the component 31. As is evident from FIG. 2, according to the invention, the phases of the processing in the components and the communication between the components is synchronized in the proposed architecture. According to Wikipedia entry for synchronization, synchronization is the coordination of events with respect to time. Synchronization therefore ensures that actions take place in a certain order or simultaneously, i.e. in sync as described in the Wikipedia entry for synchronization.

According to the invention, the time schedules for the processing of data in the components and for the exchange of messages between the components are created by a scheduler such that the phase of transmission of each message is synchronized with the corresponding phase of receipt of each transmitted message within every longest period of the entire distributed computer system, i.e. in each period, a message is transmitted before this message is received. This specification prevents a message from an earlier period from being consumed by a component before the corresponding message of the current period is produced. This type of synchronization must be ensured even if the transmitting components and the receiving components are arranged on different hierarchical levels and are spatially distributed. The implementation of such a time schedule, which is calculated by a scheduler and fulfills the aforementioned conditions, can be achieved with the TTEthernet system as described in SAE Standard von TT Ethernet.

Advantageously, an element of this series of periods corresponds exactly to the physical second, and therefore the actions of systems that do not have common internal synchronization can be synchronized via the external time.

In a safety-relevant application, there must not be any components that, in the event of failure thereof, result in faulty behavior or failure of the entire system. It is therefore advantageous to provide the communication system with a redundant design in safety-relevant applications, thereby ensuring that the failure of a subsystem of the communication system can be tolerated.

The technical development of microelectronics makes it possible to implement several of the aforementioned method steps in one or more FPGA chips or directly in ASICs. For example, fault-tolerant clock synchronization, fault containment at the level of the components, or temporal fault detection in the time-controlled communication system can be substantially supported by functions implemented in hardware. Such hardware support results in a reduction of energy consumption and silicon surface area while simultaneously increasing the throughput.

In summary, the innovative method disclosed herein reduces the complexity of safety-critical real-time systems, increases reliability, and significantly lowers the costs for system development, testing, and maintenance.

LITERATURE CITATIONS

[1] U.S. Pat. No. 7,979,247 Butterfield, et al. System, method and computer program product for developing a system-of-systems architecture model. Granted Jul. 12, 2011

[2] Austrian patent application A 1842/2011 by FTS Computertechnik GmbH dated 19 Dec. 2011. Verfahren zur zeitrichtigen Beobachtung von TTEthernet Nachrichten [*Method for Observing TTEthernet Messages at the Correct Time*].

[3] Wikipedia. Graphentheorie—Baum [*Graph theory—Tree*]

[4] Kopetz, H. Real-Time Systems, Design Principles for Distributed Embedded Applications. Springer Verlag. 2011.

[5] Simon, H. A. Science of the Artificial. MIT Press. 1962.

[6] SAE Standard von TT Ethernet. URL: http://standards.sae.org/as6802

[7] Wikipedia. Sychronisation.

The invention claimed is:

1. A method for combining results of a plurality of periodically operating components (hereafter "components") of a distributed computer system in a chronological correct manner, comprising:

the components communicate solely by messages via at least one communication system, and wherein each component has a global time with precision P, wherein each component is associated with one of n hierarchical levels, in a hierarchical system design, wherein durations of the periods of the components, which are derived from the progression of the global time, are related to each other by integer multiples, and wherein the phase of transmitting each message is synchronized with the corresponding phase of receiving each transmitted message within each longest period of the entire distributed computer system even if the transmitting components of the message and the receiving components of the message are arranged on different hierarchical levels and spatially distributed.

2. The method according to claim 1, wherein the time at which the message is transported by a time-controlled communication system is synchronized with the end of the period of the message-transmitting component.

3. The method according to claim 1, wherein a component of a hierarchical level communicates only with a component of a higher hierarchical level.

4. The method according to claim 1, wherein a component of a higher hierarchical level receives messages from a plurality of components of the lower hierarchical levels.

5. The method according claim 1, wherein the behavior of a quantity of hierarchically arranged components, which forward information to the next-higher hierarchical level and wherein the information flow forms an In tree, is replaced or replaceable by a simulation system, which replaces the upwardly directed behavior of the root of the In tree.

6. The method according to claim 1, wherein the global time is synchronized with the temps atomique international (TAI) with an accuracy A.

7. The method according to claim 1, wherein the global time is sparse.

8. The method according to claim 1, wherein a marked period of a series of possible periods has the duration of exactly one TAI second.

9. The method according to claim 1, wherein the messages received and transmitted by a component are distributed via a TTEthernet communication system.

10. The method according to claim 1, wherein the communication system has a redundant configuration.

11. The method according to claim 1, wherein at least one component, preferably every component, is a fault-containment unit.

12. The method according to claim 1, wherein one component produces either correct messages, no messages, or recognizably false messages.

13. The method according to claim 1, wherein the global time is fault-tolerant.

14. The method according to claim 1, wherein the dynamic changing of parameters of the components or the communication system is protected by cryptographic protocols.

15. The method according to claim 1, wherein one component is a restart unit, which attempts a restart immediately after a fault is detected.

16. The method according to claim 1, wherein a component that receives a message checks to determine whether the content of the message corresponds to the dynamic input assertion provided for this message.

17. The method according to claim 1, wherein the behavior of the individual components is observed at chronologically correct time without influencing the time behavior of the components.

18. A distributed computer system, comprising:
a plurality of periodically functioning components (hereafter "components"), wherein the components communicate solely by messages via at least one communication system, and wherein each component has a global time with precision P, wherein each component is associated with one of n hierarchical levels, in a system design, wherein durations of the periods of the components, which are derived from the progression of the global time, are related to each other by integer multiples, and wherein the phase of transmitting each message is synchronized with the corresponding phase of receiving each transmitted message within each longest period of the entire distributed computer system even if the transmitting components of the message and the receiving components of the message are arranged on different hierarchical levels and are spatially distributed.

19. The computer system according to claim 18, wherein the time at which the message is transported by a time-controlled communication system is synchronized with the end of the period of the message-transmitting component.

20. The computer system according to claim 18, wherein a component of a hierarchical level communicates only with a component of a higher hierarchical level.

21. The method according to claim 18, wherein a component of a higher hierarchical level receives messages from a plurality of components of the lower hierarchical levels.

22. The computer system according to claim 18, wherein the behavior of a group of hierarchically arranged components, which forward information to the next-higher hierarchical level and wherein the information flow forms an In tree, is replaced or replaceable by a simulation system, which replaces the upwardly directed behavior of the root of the In tree.

23. The computer system according to claim 18, wherein the global time is synchronized with the temps atomique international (TAI) with an accuracy A.

24. The computer system according to claim 18, wherein the global time is sparse.

25. The computer system according to claim 18, wherein a marked period of a series of possible periods has the duration of exactly one TAI second.

26. The computer system according to claim 18, wherein the messages received and transmitted by a component are distributed via a TTEthernet communication system.

27. The computer system according to claim 18, wherein the communication system has a redundant configuration.

28. The computer system according to claim 18, wherein at least one component, preferably every component, is a fault-containment unit.

29. The computer system according to claim 18, wherein one component produces either correct messages, no messages, or recognizably false messages.

30. The computer system according to claim 18, wherein the global time is fault-tolerant.

31. The computer system according to claim 18, wherein the dynamic changing of parameters of the components or the communication system is protected by cryptographic protocols.

32. The computer system according to claim 18, wherein one component is a restart unit, which attempts a restart immediately after a fault is detected.

33. The computer system according to claim 18, wherein a component that receives a message checks to determine whether the content of the message corresponds to the dynamic input assertion provided for this message.

34. The computer system according to claim 18, wherein the behavior of the individual components is observed at chronologically correct time without influencing the time behavior of the components.

* * * * *